US010218980B2

(12) United States Patent
Choi (10) Patent No.: US 10,218,980 B2
(45) Date of Patent: Feb. 26, 2019

(54) CAMERA COMPRESSING VIDEO DATA (71) Applicant: HANWHA TECHWIN CO., LTD., Changwon-daero, Seongsan-gu, Changwon-si, Gyeongsangnam-do (KR)

(72) Inventor: Moon Gyu Choi, Changwon-si (KR)

(73) Assignee: HANWHA AEROSPACE CO., LTD, Changwon-si (KR)

(*) Notice: Subject to any disclaimer, the term of this patent is extended or adjusted under 35 U.S.C. 154(b) by 289 days.

(21) Appl. No.: 15/025,431

(22) PCT Filed: Nov. 25, 2013

(86) PCT No.: PCT/KR2013/010715
§ 371 (c)(1),
(2) Date: Mar. 28, 2016

(87) PCT Pub. No.: WO2015/046665
PCT Pub. Date: Apr. 2, 2015

(65) Prior Publication Data
US 2016/0241856 A1 Aug. 18, 2016

(30) Foreign Application Priority Data

Sep. 27, 2013 (KR) .................. 10-2013-0115707

(51) Int. Cl.
*H04N 19/137* (2014.01)
*H04N 19/00* (2014.01)
(Continued)

(52) U.S. Cl.
CPC ............ *H04N 19/137* (2014.11); *H04N 7/18* (2013.01); *H04N 19/00* (2013.01);
(Continued)

(58) Field of Classification Search
CPC .................................................. H04N 19/137
See application file for complete search history.

(56) References Cited

U.S. PATENT DOCUMENTS 5,668,600 A * 9/1997 Lee ...................... H04N 19/537
348/699
7,274,387 B2 * 9/2007 Gupta ................ G06K 9/00362
348/152

(Continued)

FOREIGN PATENT DOCUMENTS

JP      2003-42796 A    2/2003
JP      2005-4256 A     1/2005

(Continued)

OTHER PUBLICATIONS

International Search Report dated May 30, 2014 in counterpart International Application No. PCT/KR2013/010715 (PCT/ISA/210/220).

(Continued)

*Primary Examiner* — William C Vaughn, Jr.
*Assistant Examiner* — Joseph Daniel A Towe
(74) *Attorney, Agent, or Firm* — Sughrue Mion, PLLC (57) ABSTRACT

Provided is a camera. The camera further includes a motion area detection sensor that is configured to receive reflected wave signals by emitting radio frequency electromagnetic wave beam to each of divided areas set in a target capture region, determine whether motion has occurred in each of the divided areas depending on changes of reflection speed of each of the received reflected wave signals, generate motion information data based on the determination result, and input the motion information data into the controller. The controller is configured to compress a series of image frame data from the capturing unit according to the motion information data from the motion area detection sensor.

14 Claims, 7 Drawing Sheets

(51) Int. Cl.
*H04N 19/177* (2014.01)
*H04N 19/43* (2014.01)
*H04N 19/577* (2014.01)
*H04N 7/18* (2006.01)

(52) U.S. Cl.
CPC ........... *H04N 19/177* (2014.11); *H04N 19/43* (2014.11); *H04N 19/577* (2014.11)

(56) References Cited

U.S. PATENT DOCUMENTS

| | | | |
|---|---|---|---|
| 8,228,364 B2* | 7/2012 | Cilia | B60R 11/04 348/39 |
| 8,355,539 B2 | 1/2013 | Tan et al. | |
| 8,611,595 B2* | 12/2013 | Son | G06T 7/2033 348/208.4 |
| 2004/0109059 A1* | 6/2004 | Kawakita | H04N 7/18 348/143 |
| 2005/0213662 A1 | 9/2005 | Owens et al. | |
| 2007/0063832 A1* | 3/2007 | Ollis | G08B 25/009 340/510 |

FOREIGN PATENT DOCUMENTS

| | | |
|---|---|---|
| JP | 2005-287031 A | 10/2005 |
| KR | 2003-0085671 A | 11/2003 |
| KR | 10-2009-0115649 A | 11/2009 |
| KR | 10-2012-0095681 A | 8/2012 |
| KR | 10-1271385 B1 | 6/2013 |
| WO | 2012115408 A2 | 8/2012 |

OTHER PUBLICATIONS

Written Opinion dated May 30, 2014 in counterpart International Application No. PCT/KR2013/010715 (PCT/ISA/237).

* cited by examiner

| PHASE SHIFT VALUE | X COORDINATES | Y COORDINATES | FREQUENCY CHANGE |
|---|---|---|---|
| 0 | 0 | 0 | 0 |
| 1 | 0 | 1 | 0 |
| 2 | 0 | 2 | 1 |
| ... | ... | ... | ... |

● IMAGE OF STATIONARY OBJECT
○ IMAGE OF MOVING OBJECT
✖ MOTION DETECTION REGION

FIG. 12

CAMERA COMPRESSING VIDEO DATA

TECHNICAL FIELD

The present invention is related to a camera, and more particularly, to a camera configured to compress video data generated while capturing a video.

BACKGROUND ART

In general, cameras compress video data while capturing videos. Compressing of the video data includes predicting image motion by analyzing a series of image frame data, and encoding the image frame data based on the predicted image motion.

Much computation operations are necessary to analyze the series of image frame data and predict image motion. Therefore, since compression is performed for a relatively long time, transmission of compressed video data may be unstable when the compressed video data is streamed to an external device.

A representative example of a compression method is an encoding method using a group of pictures (GOP) in Motion Pictures Experts Group 1/2 (MPEG-1/2).

For example, when a unit of GOP is 10 image frames, a first image frame is an intra frame, and second to tenth image frames are predicted frames and bidirectional frames.

An intra frame, which is referred to as 'I frame,' is a frame in which original image data is internally compressed according to the Joint Photograph Experts Group (JPEG) compression method. The intra frame has a relatively large amount of compressed data A predicted frame, which is referred to as 'P frame,' is obtained by performing various computation operations to analyze image data of previous frames and predict image motion in a current frame, and encoding image data of the current frame based on the predicted motion. Therefore, data of the P frame is less than data of the I frame, but generation time of the P frame is longer than that of the I frame.

A bidirectional frame, which is referred to as 'B frame,' is obtained by performing various computation operations to analyze image data of previous frames and image data of following frames and predict image motion of a current frame, and encoding the image data of the current frame based on the predicted motion. Therefore, data of the B frame is less than the data of the P frame, but longer time is consumed to generate the B frame than the P frame.

In summary, longer time is necessary to generate the bidirectional frame, i.e., the B frame, and the predicted frame, i.e., the P frame.

Therefore, in order to compress video data, cameras in the related art require much computation processing to analyze a series of image frame data and predict image motion. Thus, since compression is performed for a relatively long time, transmission of compressed video data may be unstable when the compressed video data is streamed to an external device. Also, restoration time may increase as much as increased compression time.

For example, when a surveillance camera compresses live-view video data and transmits the compressed data to an external device, a user of the external device may not be able to watch a live-view video without buffering.

DETAILED DESCRIPTION OF THE INVENTION

Technical Problem

Embodiments of the present invention provide a camera for compressing video data which is capable of reducing compression time without expanding compressed data.

Technical Solution

According to an aspect of the present invention, a camera includes a controller; a capturing unit; and a motion area detection sensor. The motion area detection sensor is configured to operate under the control of the controller, receive reflected wave signals by emitting radio frequency electromagnetic wave beam to each of divided areas set in a target capture region, determine whether motion has occurred in each of the divided areas depending on changes of reflection speed of each of the received reflected wave signals, generate motion information data of the determination result, and input the motion information data into the controller. The controller is configured to compress a series of image frame data from the capturing unit according to the motion information data from the motion area detection sensor.

According to an embodiment, the controller is configured to output, from among the divided areas, image data of at least one divided area in which the motion has occurred is output as compressed frame data.

According to an embodiment, the motion area detection sensor comprises a wireless transceiver and a motion area determinator, and the wireless transceiver is configured to convert digital transmission signals from the motion area determinator into the radio frequency electromagnetic wave beam, receive the reflected wave signals by sequentially emitting the converted electromagnetic wave beam to each of the divided areas of the target capture region, convert the received reflected wave signals into digital reflected wave signals, and input the digital reflected wave signals into the motion area determinator.

According to an embodiment, the motion area determinator is configured to generate the digital transmission signals according to synchronization control signals from the controller and input the digital transmission signals to the wireless transceiver, determine whether the reflection speed has changed based on each of the digital reflected wave signals received from the wireless transceiver, determine whether motion has occurred in each of the divided areas based on the change of the reflection speed, generate the motion information data of the determination result, and input the motion information data into the controller.

According to an embodiment, the controller is configured to input the synchronization control signal into the motion area determinator, compress the series of image frame data from the capturing unit according to the motion information data from the motion area determinator, and from among the divided areas, output image data of at least one divided area in which motion has occurred as compressed frame data.

According to an embodiment, the wireless transceiver comprises a phase shifter and a phased array antenna, the phase shifter is configured to shift phase of each of radio frequency transmission signals that are input, output the phase-shifted radio frequency transmission signals to each of unit antennas of the phased array antenna, and receive radio frequency reflection signals from each of the unit antennas of the phased array antenna, and the phased array antenna is configured to sequentially emit the electromagnetic wave beam according to the radio frequency transmission signals from the phase shifter to each of the divided areas of the target capture region, and output the received reflection signals to the phase shifter.

According to an embodiment, a number of the divided areas of the target capture region is the same as a number of phase shifts performed by the phase shifter during a cycle of a unit image frame.

According to an embodiment, the motion information data from the motion area detection sensor includes phase shift values of the phase shifter; and logical values that indicate motion occurrence in divided areas that respectively correspond to the phase shift values.

According to an embodiment, in an image frame from the capturing unit, a divided area is set for each of the phase shift values of the phase shifter.

According to an embodiment, the wireless transceiver comprises a digital analog converter (DAC), a radio frequency modulator, a circulator, a splitter-synthesizer, a phase shifter, a phased array antenna, an amplifier, a radio frequency demodulator, and an analog digital converter (ADC). The DAC is configured to convert the digital transmission signals from the motion area determinator into analog transmission signals and output the analog transmission signals to the radio frequency modulator. The radio frequency modulator is configured to increase frequency of the analog transmission signals from the DAC to radio frequency and output radio frequency transmission signals to the circulator. The circulator is configured to output the radio frequency transmission signals from the radio frequency modulator to the splitter-synthesizer, and output radio frequency reflection signals from the splitter-synthesizer to the amplifier. The splitter-synthesizer is configured to split the radio frequency transmission signals from the circulator by a number of unit antennas of the phased array antenna, and synthesize the radio frequency reflection signals from the phase shifter and output the synthesized radio frequency reflection signals to the circulator. The phase shifter is configured to shift phase of each of the radio frequency transmission signals from the splitter-synthesizer, output the phase-shifted radio frequency transmission signals to each of the unit antennas of the phased array antenna, and output the radio frequency reflection signals from each of the unit antennas of the phased array antenna to the splitter-synthesizer. The amplifier is configured to amplify frequency of the radio frequency reflection signals from the circulator and output the frequency-amplified radio frequency reflection signals to the radio frequency demodulator. The radio frequency demodulator is configured to output base frequency reflection signals to the ADC, wherein the base frequency reflection signals are obtained by decreasing the frequency of the radio frequency reflection signals from the amplifier to baseband frequency. The ADC is configured to convert the base frequency reflection signals from the radio frequency demodulator into digital reflection signals and output the digital reflection signals to the motion area determinator.

Advantageous Effects of the Invention

The camera according to the embodiments of the present invention may compress a series of image frame data from the capturing unit based on the motion information data from the motion area detection sensor.

Therefore, in comparison to video data compression performed by cameras of the related art, it is unnecessary to analyze the series of image frame data and predict image motion. That is, compression time may decrease without expanding compressed data.

With regard to this, the camera according to the embodiment of the present invention may stably stream compressed video data to an external device. Also, restoration time may be reduced as much as reduced compression time.

For example, when a surveillance camera compresses live-view video data and transmits the compressed data to an external device, a user of the external device may be able to watch a live-view video without buffering.

Furthermore, from among the divided areas, the controller may output image data of at least one divided area in which motion has occurred as compressed frame data.

Therefore, compression and restoration time may be further reduced because less encoding and decoding operations may be performed compared to video data compression of the cameras of the related art.

BEST MODE

Hereinafter, one or more embodiments will now be described with reference to the accompanying drawings so that this disclosure will be thorough and complete, and will convey the inventive concept to one of ordinary skill in the art.

The description and the accompanying drawings are provided to facilitate understanding of operations according to the present invention. The components and features that are easily implementable by one of ordinary skill in the art may be omitted.

Also, the present specification and drawings should not be construed as limiting the present invention. The scope of the present invention is defined by the appended claims. The meanings and concepts of terminology used herein should be interpreted with regard to the technical concept of the present invention so that the present invention is appropriately described.

Hereinafter, embodiments of the present invention will be described with reference to the accompanying drawings.

Figure 1:
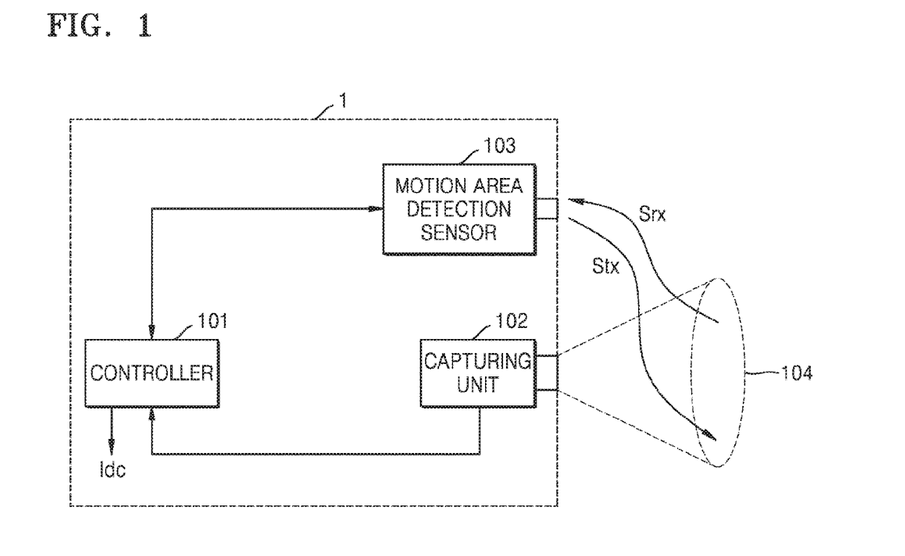
FIG. 1 is a diagram of a camera according to an embodiment of the present invention.
Figure 2:
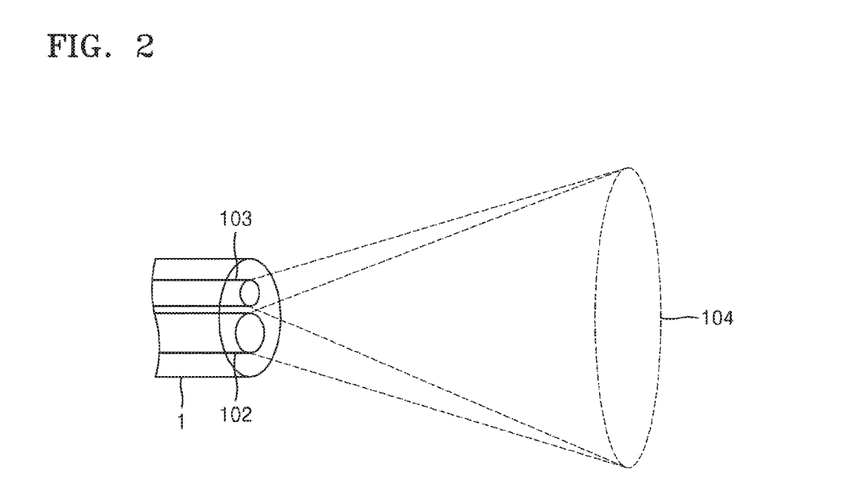
FIG. 2 is a diagram of a motion area detection sensor and a capturing unit of FIG. 1 operating with respect to an identical target capture region.

FIG. 1 is a diagram of a camera according to an embodiment of the present invention. FIG. 2 is a diagram of a motion area detection sensor and a capturing unit of FIG. 1 operating with respect to an identical target capture region. In FIGS. 1 and 2, like reference numerals refer to like elements.

Referring to FIGS. 1 and 2, a camera 1 according to an embodiment of the present invention is a camera including a controller 101 and a capturing unit 102. The camera 1 may further include a motion area detection sensor 103.

The motion area detection sensor 103 operates under the control of the controller 101, and operates as below at every cycle of video frames.

First, the motion area detection sensor 103 may sequentially emit radio frequency electromagnetic wave beam Stx on each of divided areas set on a target capture region 104 and receive reflected wave signals Srx.

Also, the motion area detection sensor 103 may determine whether motion has occurred in the divided areas depending on changes of reflection speed of each of the received reflected wave signals Srx, and generate motion information data of the determination result and input the motion information data into the controller 101. According to the present embodiment, the reflection speed of each of the received reflected wave signals Srx are expressed in frequency.

The controller 101 may compress a series of image frame data from the capturing unit 102 according to the motion information data from the motion area detection sensor 103. According to the present embodiment, compressed video data Idc from the controller 101 is transmitted to an external device via communications network.

Therefore, the camera 1 according to the embodiment of the present invention does not need to analyze the series of image frame data and predict image motion, unlike video data compression of cameras in the related art. That is, compression time may decrease even without increasing compressed data Idc.

With regard to this, the camera 1 according to the embodiment of the present invention may stably stream the compressed video data Idc to the external device. Also, restoration time may be reduced as much as reduced compression time.

For example, when a surveillance camera compresses live-view video data Idc and transmits the compressed video data Idc to an external device, a user of the external device may be able to watch a live-view video without buffering.

According to the present embodiment, from among the divided areas, the controller 101 may output image data of at least one divided area in which motion has occurred as the compressed frame data Idc.

Therefore, compression and restoration time may be further reduced because less encoding and decoding operations may be performed compared to the video data compression of the cameras of the related art.

Figure 3:
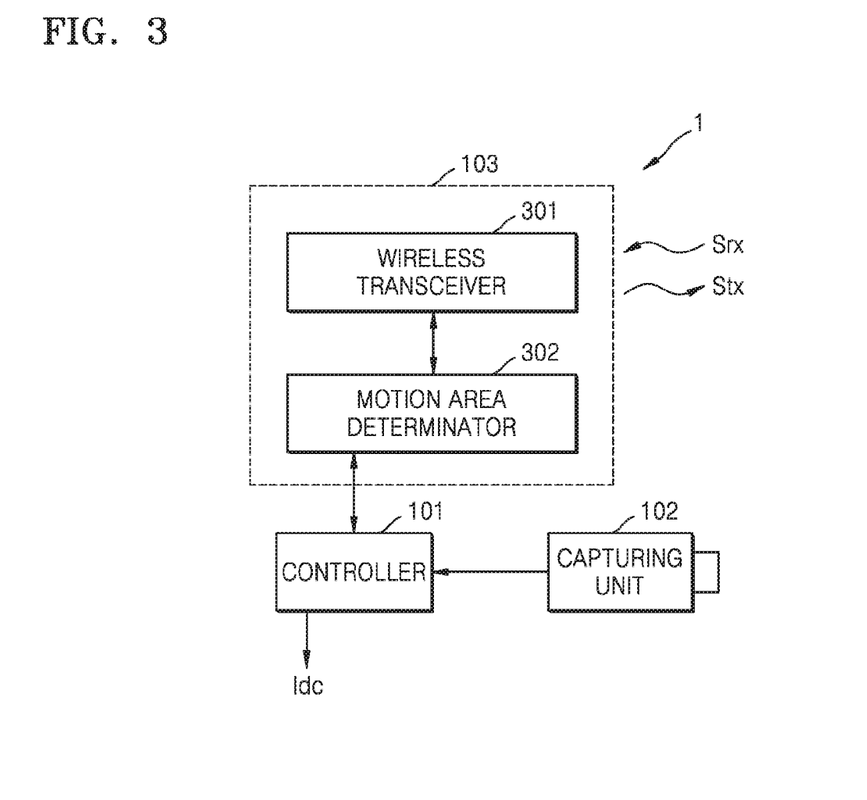
FIG. 3 is a block diagram of the motion area detection sensor of FIGS. 1 and 2.

FIG. 3 is a block diagram of the motion area detection sensor 103 of FIGS. 1 and 2. In FIGS. 1 to 3, like reference numerals indicate like elements.

Referring to FIGS. 1 to 3, the motion area detection sensor 103 of the FIGS. 1 and 2 includes a wireless transceiver 301 and a motion area determinator 302.

The wireless transceiver 301 performs the following operations.

First, the wireless transceiver 301 may convert digital transmission signals from the motion area determinator 302 into the radio frequency electromagnetic wave beam Stx, sequentially emit the converted electromagnetic wave beam Stx to each of the divided areas of the target capture region 104, and receive the reflected wave signals Srx.

Second, the wireless transceiver 301 may convert the received reflected wave signals Srx into digital reflected wave signals and input the digital reflected wave signals into the motion area determinator 302.

The motion area determinator 302 performs the following operations.

First, the motion area determinator 302 may generate the digital transmission signals according to synchronization control signals from the controller 101 and input the digital transmission signals to the wireless transceiver 301.

Second, the motion area determinator 302 may determine whether the reflection speed has changed based on each of the digital reflected wave signals received from the wireless transceiver 301. According to the present embodiment, the reflection speed measured by the motion area determinator 302 is expressed in frequency.

Third, the motion area determinator 302 may determine whether motion has occurred in each of the divided areas based on the change of the reflection speed, and generate the motion information data of the determination result and input the motion information data into the controller 101.

The controller 101 may input the synchronization control signal into the motion area determinator 302, and compress a series of image frame data from the capturing unit 102 according to the motion information data from the motion area determinator 302.

According to the present embodiment, from among the divided areas, the controller 101 may output image data of at least one divided area in which motion has occurred as compressed frame data Idc.

Figure 4:
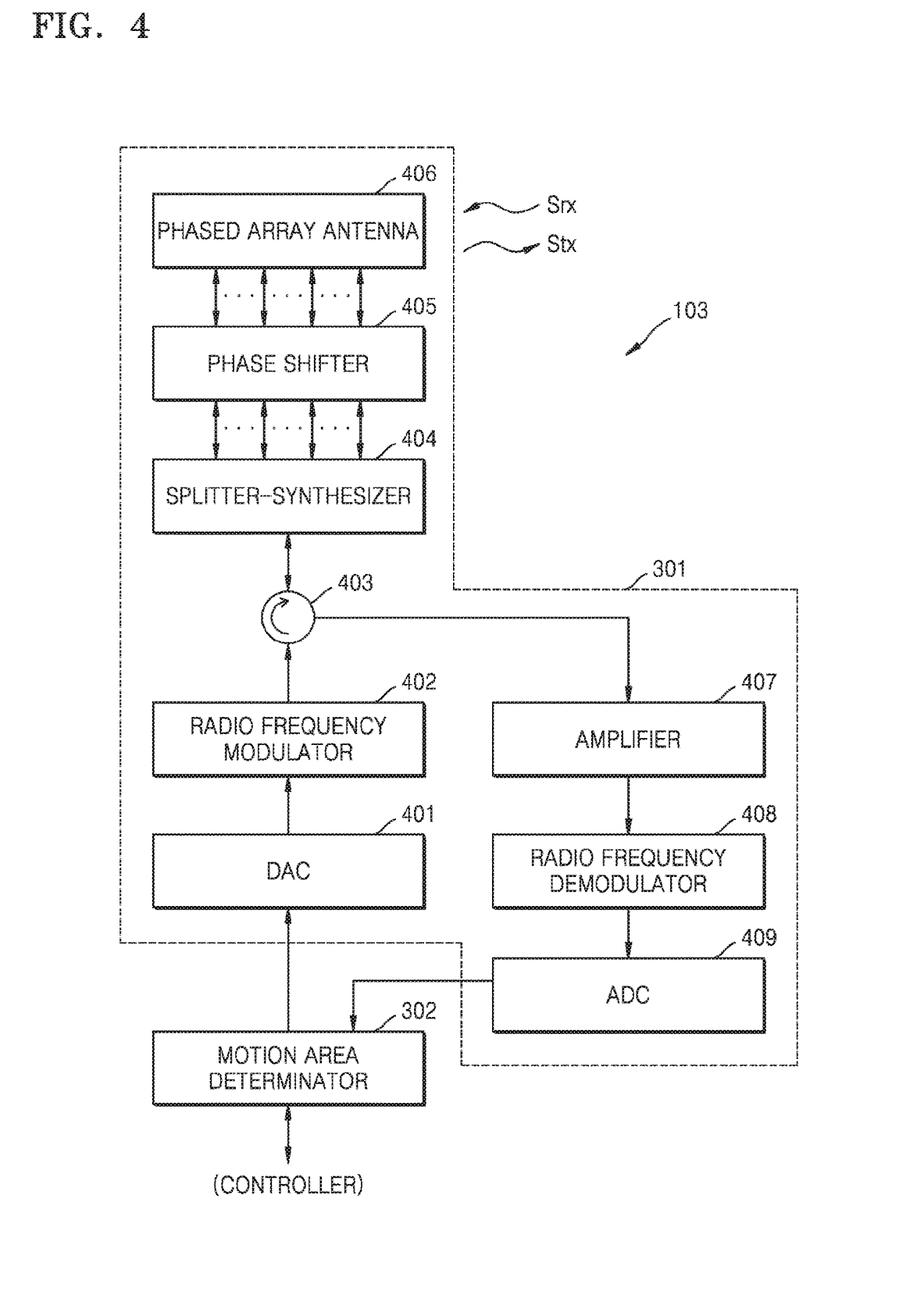
FIG. 4 is a block diagram of a wireless transceiver of FIG. 3.

FIG. 4 is a block diagram of a wireless transceiver of FIG. 3.

Referring to FIGS. 3 and 4, the wireless transceiver 301 includes a digital analog converter (DAC) 401, a radio frequency modulator 402, a circulator 403, a splitter-synthesizer 404, a phase shifter 405, a phased array antenna 406, an amplifier 407, a radio frequency demodulator 408, and an analog digital converter (ADC) 409.

The DAC 401 converts the digital transmission signals from the motion area determinator 302 into analog transmission signals and output the analog transmission signals to the radio frequency modulator 402.

The radio frequency modulator 402 may increase frequency of the analog transmission signals from the DAC 401 to radio frequency and output radio frequency transmission signals to the circulator 403.

The circulator 403, which may also be referred to as a rat-race divider, outputs the radio frequency transmission signals from the radio frequency modulator 402 to the splitter-synthesizer 404, and output radio frequency reflection signals from the splitter-synthesizer 404 to the amplifier 407.

The splitter-synthesizer 404 splits the radio frequency transmission signals from the circulator 403 by the number of unit antennas of the phased array antenna 406, and synthesizes the radio frequency reflection signals from the phase shifter 405 and output the synthesized radio frequency reflection signals to the circulator 403.

The phase shifter 405 shifts phase of each of the radio frequency transmission signals from the splitter-synthesizer 404 and outputs the phase-shifted radio frequency transmission signals to each of the unit antennas of the phased array antenna 406. Then, the phase shifter 405 outputs the radio frequency reflection signals from each of the unit antennas of the phased array antenna 406 to the splitter-synthesizer 404.

When the phase of each of the radio frequency transmission signals from the splitter-synthesizer 404 is shifted and the phase-shifted radio frequency transmission signals is output to the unit antennas of the phased array antenna 406, the phased array antenna 406 may sequentially emit the electromagnetic wave beam Stx to each of the divided areas of the target capture region 104 and receive the reflected wave signals Srx.

The amplifier 407 may amplify frequency of the radio frequency reflection signals from the circulator 403 and output the frequency-amplified radio frequency reflection signals to the radio frequency demodulator 408.

The radio frequency demodulator 408 may output base frequency reflection signals to the ADC 409. The base frequency reflection signals may be obtained by decreasing the frequency of the radio frequency reflection signals from the amplifier 407 to baseband frequency.

The ADC 409 converts the base frequency reflection signals from the radio frequency demodulator 408 into digital reflection signals and output the digital reflection signals to the motion area determinator 302.

Figure 5:
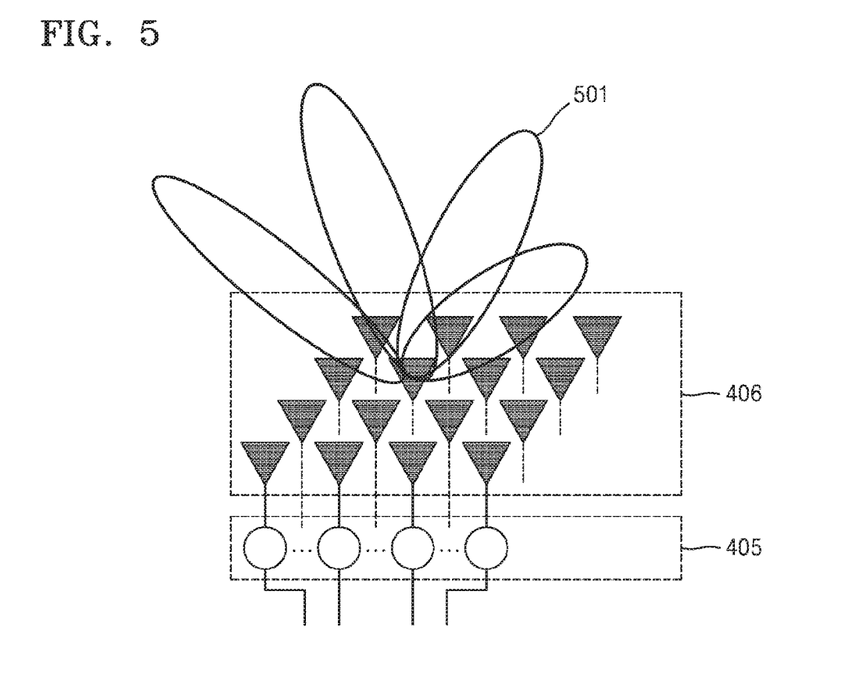
FIG. 5 is a diagram for describing operations of a phase shifter and a phased array antenna of FIG. 4.
Figure 6:
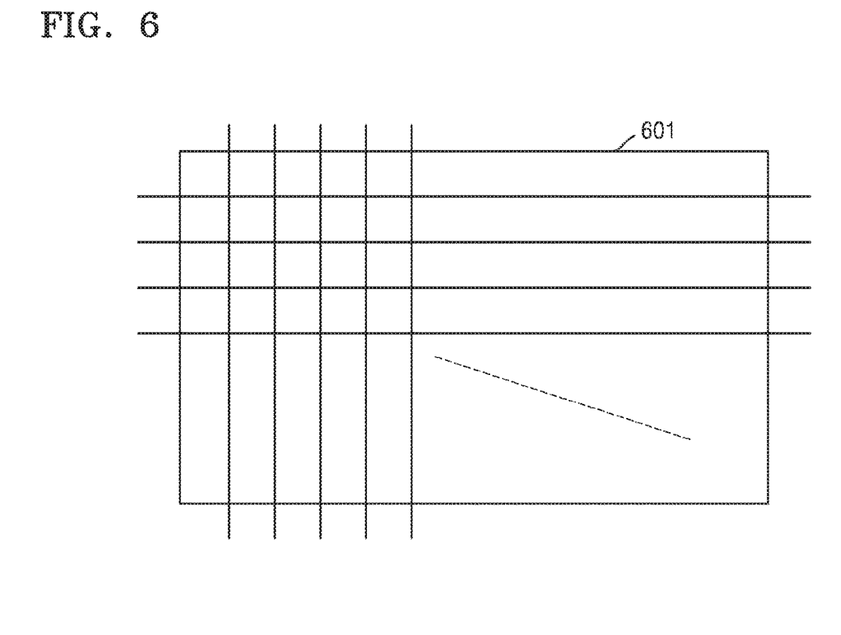
FIG. 6 is a diagram for describing setting of divided areas in the target capture region applied to the motion area detection sensor of FIGS. 1 and 2.
Figure 7:
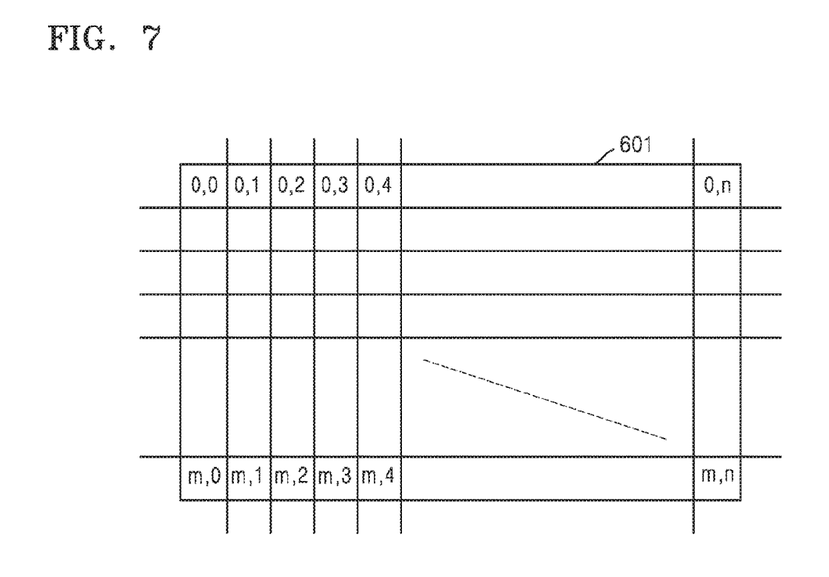
FIG. 7 is a diagram of location coordinates of the divided areas that are set in the target capture region applied to the motion area detection sensor of FIGS. 1 and 2.

FIG. 5 is a diagram for describing operations of the phase shifter 405 and the phased array antenna 406 of FIG. 4. FIG. 6 is a diagram for describing setting of divided areas in a target capture region 601 applied to the motion area detection sensor 103 of FIGS. 1 and 2. FIG. 7 is a diagram of location coordinates of the divided areas that are set in the target capture region 601 applied to the motion area detection sensor 103 of FIGS. 1 and 2.

Referring to FIGS. 4 to 7, the phase shifter 405 shifts the phase of each of input radio frequency transmission signals and outputs the phase-shifted radio frequency transmission signals to each of the unit antennas of the phased array antenna 406. Then, the phase shifter 405 receives radio frequency reflected signals Srx from each of the unit antennas of the phased array antenna 406.

Accordingly, the phased array antenna 406 sequentially emits electromagnetic wave beam (Stx) 501 according to the radio frequency transmission signals from the phase shifter 405 to each of the divided areas of the target capture region 104 of FIGS. 1 and 2, and output the received radio frequency reflected signals Srx to the phase shifter 405.

Therefore, the number of divided areas of the target capture region 601 applied to the motion area detection sensor 103 is the same as the number of phase shifts performed by the phase shifter 405 during a cycle of a unit image frame.

Figure 8:
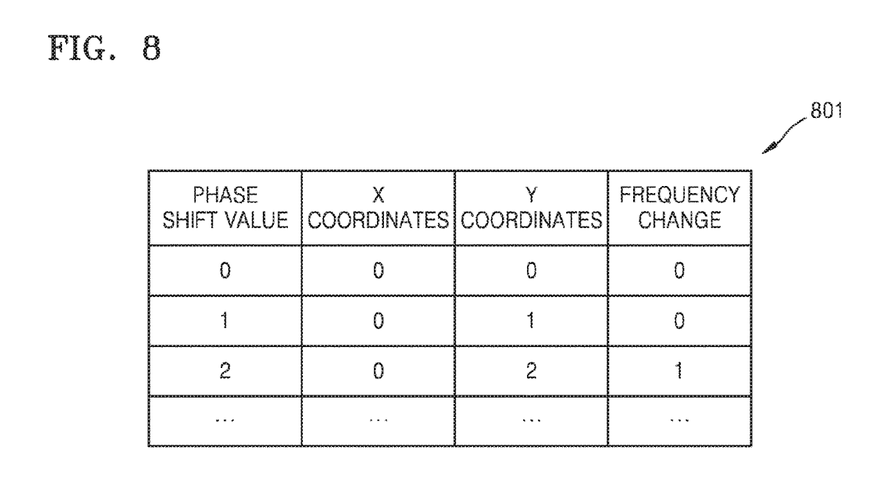
FIG. 8 is a table for describing motion information data from the motion area detection sensor of FIGS. 1 and 2.

FIG. 8 is a table for describing motion information data 801 from the motion area detection sensor 103 of FIGS. 1 and 2.

Referring to FIG. 8, the motion information data 801 from the motion area detection sensor 103 includes phase shift values of a phase shifter, respective location coordinates of a divided area corresponding to each of the phase shift values, and logical values of frequency change.

In this case, the frequency change indicates whether reflection speed has changed, that is, whether motion has occurred in the divided area corresponding to each of the phase shift values.

When the controller 101 of FIGS. 1 and 3 knows about the respective location coordinates of the divided area corresponding to each of the phase shift values, the motion information data 801 may only include the phase shift values of the phase shifter and the logical values of the frequency change.

Figure 9:
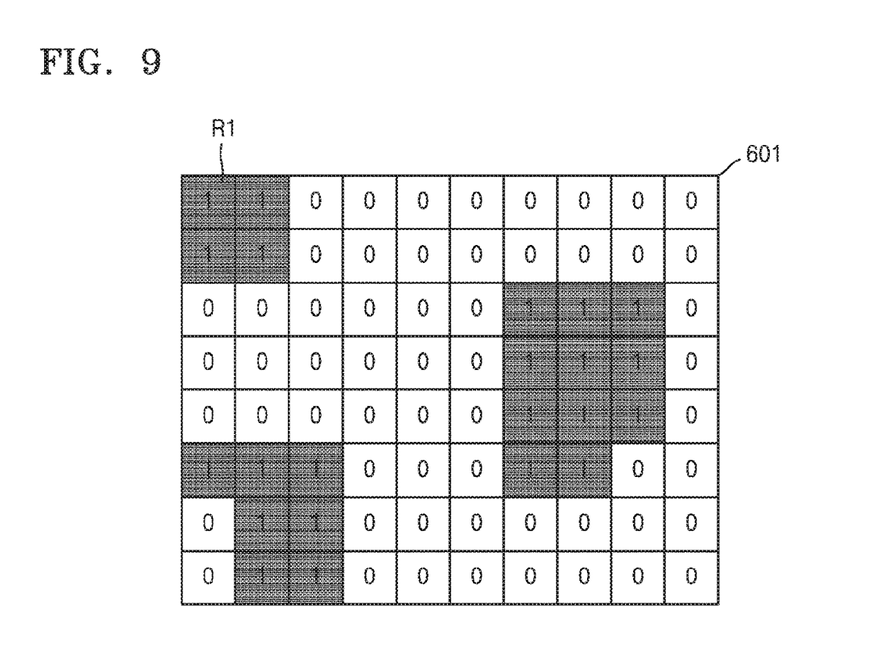
FIG. 9 is a diagram of an example of logical values that indicate motion occurrence in each of the divided areas of FIG. 7.

FIG. 9 is a diagram of an example of logical values that indicate motion occurrence in each of the divided areas of FIG. 7. Logical values "0" and "1" in FIG. 9 are the same as logical values "0" and "1" related to the frequency change in FIG. 8.

Referring to FIG. 9, in a current compression target frame, motion has not occurred in divided areas with logic "0" and motion has occurred in divided areas with logic "1."

Figure 10:
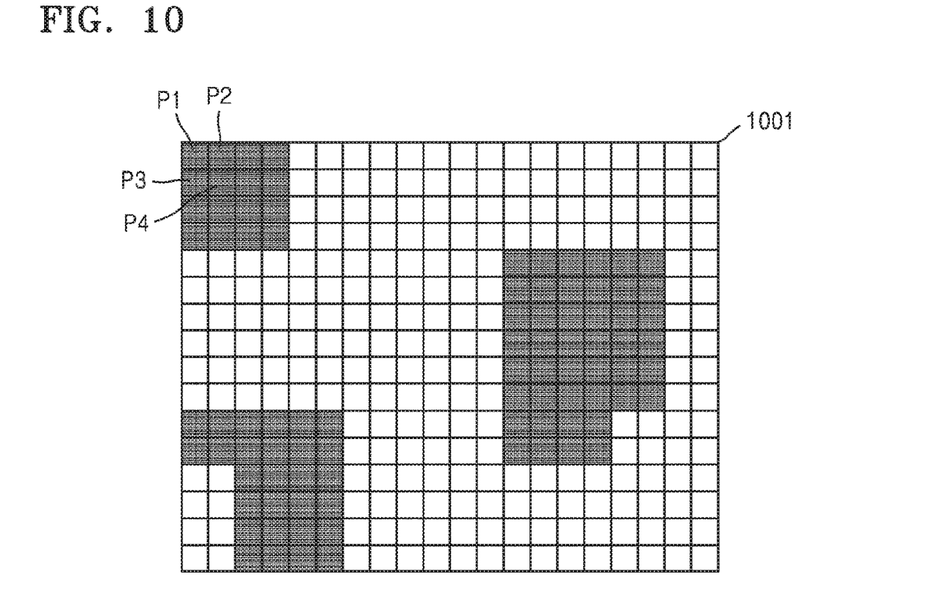
FIG. 10 is a diagram of respectively mapping of the divided areas of the target capture region applied to the motion area detection sensor to pixels of the target capture region applied to the capturing unit.

FIG. 10 is a diagram of respectively mapping of the divided areas of the target capture region 601 applied to the motion area detection sensor 103 of FIGS. 1 to 3 to pixels of a target capture region 1001 applied to the capturing unit 102 of FIGS. 1 to 3.

Referring to FIGS. 5, 9, and 10, for example, a first divided area R1 of the target capture region 601 applied to the motion area detection sensor 103 is mapped to four pixels P1 to P4 of the target capture region 1001 applied to the capturing unit 102.

That is, in the controller 101 of FIGS. 1 and 3, with respect to an image frame from the capturing unit 102 of FIGS. 1 to 3, a divided area is set for each of the phase shift values of the phase shifter 405.

Figure 11:
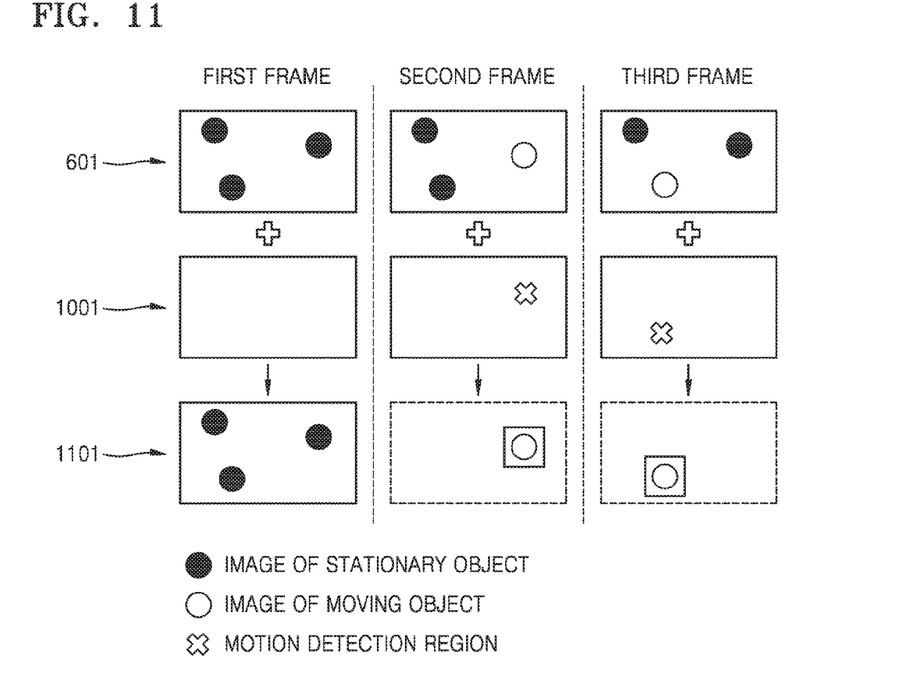
FIG. 11 is a diagram for describing compression operations of a controller of FIGS. 1 and 3.

FIG. 11 is a diagram for describing compression operations of the controller 101 of FIGS. 1 and 3. In FIG. 11, a reference numeral 601 indicates a target capture region applied to the motion area detection sensor 103 of FIGS. 1 to 3, a reference numeral 1001 indicates a target capture region applied to the capturing unit 102 of FIGS. 1 to 3, and a reference numeral 1101 indicates compressed video data.

Referring to FIG. 11, a low compression rate is applied to a first frame, even though motion has not detected from the first frame, because the first frame is a reference frame of a set cycle.

For example, the first frame is an intra frame of a group of pictures (GOP) in Motion Pictures Experts Group 1/2 (MPEG-1/2). As described above, the intra frame, which is referred to as 'I frame,' is a frame in which original image data is internally compressed according to the Joint Photograph Experts Group (JPEG) compression method. The intra frame has a relatively large amount of compressed data.

Next, motion has occurred in at least one divided area of second and third frames, and thus, only image data of the divided area in which the motion has occurred is output as compressed frame data 1101.

Figure 12:
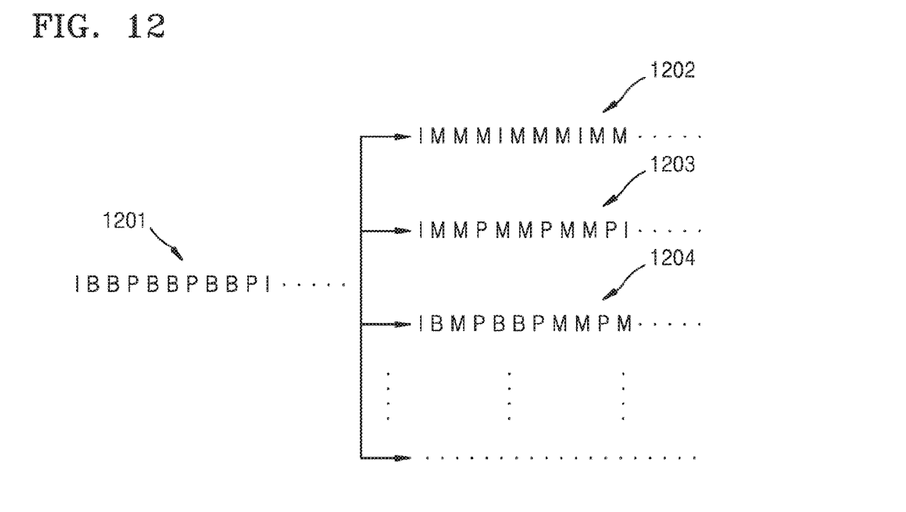
FIG. 12 is a diagram for describing various applications of the compression operations of FIG. 11.

FIG. 12 is a diagram for describing various applications of the compression operations of FIG. 11. In FIG. 12, the encoding method using GOP in MPEG-1/2 is used.

In FIG. 12, "I" indicates an intra frame that is referred to as 'I frame,' "P" indicates a predicted frame that is referred to as 'P frame,' "B" indicates a bidirectional frame that is referred to as 'B frame,' and "M" indicates a motion frame according to an embodiment of the present invention.

With regard to the motion frame "M" according to an embodiment of the present invention, as described above, from among the divided areas, only image data of the divided area in which the motion has occurred is output as compressed frame data.

Referring to FIG. 12, in the case of using GOP 1201 of MPEG-1/2, relatively longer time is necessary to generate the bidirectional frame "B" and the predicted frame "P."

With regard to a GOP 1202, 1203, or 1204 in which the motion frame "M" according to the present embodiment is inserted, compression speed may increase in proportion to an insertion rate of the motion frame "M."

As described above, a camera according to the embodiment of the present invention compresses a series of image frame data from a capturing unit according to motion information data from a motion area detection sensor.

Accordingly, in comparison to video data compression of cameras of the related art, it is unnecessary to analyze the series of image frame data and predict image motion. That is, compression time may decrease without increasing compressed data.

With regard to this, the camera according to the embodiment of the present invention may stably stream compressed video data to an external device. Also, restoration time may be reduced as much as reduced compression time.

For example, when a surveillance camera compresses live-view video data and transmits the compressed data to an external device, a user of the external device may be able to watch a live-view video without buffering.

Furthermore, from among the divided areas, the controller may output only image data of at least one divided area in which motion has occurred as compressed frame data.

Therefore, compression and restoration time may be further reduced because less encoding and decoding operations may be performed compared to video data compression of the cameras of the related art.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

INDUSTRIAL APPLICABILITY

The present invention is most likely to be applied to image processing devices that are connected to cameras.

The invention claimed is:

1. A camera comprising:
a capturing unit that receives image frame data;
a motion area detection sensor configured to receive reflected waves by emitting electromagnetic waves to each of divided areas of a target capture region, generate motion information of each of the divided areas based on the reflected waves, and determine at least one area of the divided areas in which motion has occurred, based on the motion information; and
a processor configured to compress the image frame data, which is received from the capturing unit, into a part of the image frame data that comprises the at least one area in which the motion has occurred,
wherein the motion information comprises coordinates of the divided areas, and comprises either a first binary value indicating that motion occurs at a corresponding area of the divided areas or a second binary value indicating that motion has not occurred at the corresponding area of the divided areas,
wherein the motion area detection sensor is configured to determine whether reflection speed of the reflected waves changes, determine whether motion has occurred in each of the divided areas based on a determination of whether the reflection speed changes, and generate the motion information, and
wherein the motion area detection sensor is configured to determine whether frequency of the reflected waves changes, determine whether motion has occurred in each of the divided areas based on a determination of whether the frequency changes, and generate the motion information.

2. The camera of claim 1, wherein the processor is configured to output, from among the divided areas, image data of the at least one area in which the motion has occurred as the compressed image frame data.

3. The camera of claim 1, wherein the motion area detection sensor comprises:
a wireless transceiver configured to convert digital transmission signals into the electromagnetic waves, receive the reflected waves by emitting the electromagnetic waves to each of the divided areas, and convert the received reflected waves to digital reflected wave signals; and
a motion area determination unit configured to generate and input the digital transmission signals into the wireless transceiver, and generate the motion information based on a determination of whether motion has occurred in each of the divided areas based on the digital reflected wave signals from the wireless transceiver.

4. The camera of claim 3, wherein the wireless transceiver comprises a phase shifter and a phased array antenna,
the phase shifter is configured to shift phase of each of input radio frequency transmission signals, output the phase-shifted radio frequency transmission signals to each of unit antennas of the phased array antenna, and receive radio frequency reflection signals from each of the unit antennas of the phased array antenna,
the phased array antenna is configured to sequentially emit the electromagnetic waves according to the radio frequency transmission signals from the phase shifter to each of the divided areas of the target capture region, and output the received reflection signals to the phase shifter.

5. The camera of claim 4, wherein a number of the divided areas of the target capture region is equal to a number of phase shifts performed by the phase shifter.

6. The camera of claim 5, wherein the motion information comprises:
phase shift values of the phase shifter; and
logical values that indicate motion occurrence in the divided areas that respectively correspond to the phase shift values.

7. The camera of claim 6, wherein, an area corresponding to each of the phase shift values of the phase shifter is set in an image frame from the capturing unit.

8. The camera of claim 4, wherein the wireless transceiver comprises:
a digital analog converter configured to convert the digital transmission signals from the motion area determination unit into analog transmission signals;
a radio frequency modulator configured to increase frequency of the analog transmission signals to radio frequency and output radio frequency transmission signals;

a splitter-synthesizer configured to split the radio frequency transmission signals by a number of the unit antennas of the phased array antenna, output the radio frequency transmission signals to the phase shifter, and synthesize the radio frequency reflection signals from the phase shifter;

an amplifier configured to amplify frequency of the radio frequency reflection signals;

a radio frequency demodulator configured to output base frequency reflection signals obtained by decreasing the frequency of the radio frequency reflection signal to baseband frequency;

an analog digital converter configured to convert the base frequency reflection signals into digital reflection signals and output the digital reflection signals to the motion area determination unit; and a circulator configured to output the radio frequency transmission signals from the radio frequency modulator to the splitter-synthesizer, and output radio frequency reflection signals from the splitter-synthesizer to the amplifier.

9. The camera of claim 1, wherein the processor is configured to output a motion frame which is obtained by compressing the image frame data from the capturing unit and that only comprises image data of the at least one area in which the motion has occurred.

10. The camera of claim 9, wherein the motion frame is inserted to a group of pictures (GOP).

11. A method of processing an image processing of a camera that comprises a capturing unit and a motion area detection sensor, the method comprising:

receiving, by the motion area detection sensor, reflected waves by emitting electromagnetic waves to each of divided areas of a target capture region;

generating, by the motion area detection sensor, motion information of each of the divided areas based on the reflected waves;

determining at least one area of the divided areas in which motion has occurred, based on the motion information; and compressing image frame data, which is received from the capturing unit, into image data of the at least one area in which the motion has occurred according to the motion information, performed by a processor, wherein the motion information comprises coordinates of the divided areas, and comprises either a first binary value indicating that motion occurs at a corresponding area of the divided areas or a second binary value indicating that motion has not occurred at the corresponding area of the divided areas, wherein the generating of the motion information comprises determining whether reflection speed of the reflected waves changes, determining whether motion has occurred in each of the divided areas based on a determination of whether the reflection speed changes, and generating the motion information, and wherein the generating of the motion information comprises determining whether frequency of the reflected waves changes, determining whether motion has occurred in each of the divided areas based on a determination of whether the frequency changes, and generating the motion information.

12. The method of claim 11, wherein the generating of the motion information comprises:

converting digital transmission signals into the electromagnetic waves;

receiving the reflected waves by emitting the electromagnetic waves to each of the divided areas;

converting the received reflected waves to digital reflected wave signals; and generating the motion information by determining whether motion has occurred in each of the divided areas based on the digital reflected wave signals.

13. The method of claim 11, wherein the compressing of the image frame data comprises outputting a motion frame which is obtained by compressing the image frame data from the capturing unit and that only comprises the image data of the at least one area in which the motion has occurred.

14. The method of claim 13, wherein the motion frame is inserted to a group of pictures (GOP).

* * * * *